(12) United States Patent
Aschenbroich

(10) Patent No.: US 10,988,906 B2
(45) Date of Patent: Apr. 27, 2021

(54) CONTROLLING BACKFLOW FROM DRILLING WITH HOLLOW REBAR AND GROUTING

(71) Applicant: Horst K. Aschenbroich, Surrey (CA)

(72) Inventor: Horst K. Aschenbroich, Surrey (CA)

( * ) Notice: Subject to any disclaimer, the term of this patent is extended or adjusted under 35 U.S.C. 154(b) by 259 days.

(21) Appl. No.: 16/298,937

(22) Filed: Mar. 11, 2019

(65) Prior Publication Data

US 2020/0291593 A1    Sep. 17, 2020

(51) Int. Cl.
| | | |
|---|---|---|
| *E02D 5/22* | (2006.01) | |
| *E02D 5/80* | (2006.01) | |
| *E02D 3/12* | (2006.01) | |
| *E02D 15/04* | (2006.01) | |
| *C09K 17/10* | (2006.01) | |
| *E02D 5/54* | (2006.01) | |

(52) U.S. Cl.
CPC .............. *E02D 3/12* (2013.01); *C09K 17/10* (2013.01); *E02D 5/80* (2013.01); *E02D 15/04* (2013.01); *E02D 5/54* (2013.01); *E02D 2250/003* (2013.01); *E02D 2600/30* (2013.01)

(58) Field of Classification Search
CPC .... E02D 3/12; E02D 5/54; E02D 5/80; E02D 15/04; E02D 2250/003; E02D 2600/30; C09K 17/10
See application file for complete search history.

(56) References Cited

U.S. PATENT DOCUMENTS

| | | | | |
|---|---|---|---|---|
| 4,411,557 A * | 10/1983 | Booth | ...................... | E02D 5/54 405/238 |
| 9,074,473 B2 * | 7/2015 | Alter | ...................... | E21D 5/06 |
| 9,890,511 B1 * | 2/2018 | Adams | ...................... | E02D 5/808 |
| 2006/0263150 A1 * | 11/2006 | Barrett | ...................... | E02D 3/12 405/259.5 |
| 2008/0008539 A1 * | 1/2008 | Alter | ...................... | E02D 5/665 405/232 |
| 2010/0166505 A1 * | 7/2010 | Barrett | ...................... | E02D 3/12 405/259.5 |
| 2012/0177448 A1 * | 7/2012 | Steyn | ...................... | E21D 20/028 405/259.5 |

(Continued)

OTHER PUBLICATIONS

Con-Tech Systems, "TITAN IBO 73+103 Installation Steps," www.contechsystems.com, Sep. 2018.

*Primary Examiner* — Benjamin F Fiorello
(74) *Attorney, Agent, or Firm* — Muirhead and Saturnelli, LLC

(57) ABSTRACT

Backflow during installation of a ground anchor is controlled using a preventer, and the preventer is removed during curing of grout and backflow. A cylinder may be inserted at least partially into a structure, and the preventer placed or attached atop the cylinder. A hollow bar may be extended through the preventer and cylinder into one or more layers of materials beyond the cylinder. Grout may be delivered to the layer(s) through the hollow bar, which may cause a viscous backflow to flow into the cylinder and preventer. During application of the grout, the preventer may be used to control a rate of backflow. After application of the grout, the preventer may put into an open position, and a seal assembly forced down the hollow bar, through an interior cavity of the preventer, to a position below the preventer, after which the preventer may be removed while the grout and backflow cure.

20 Claims, 8 Drawing Sheets

(56) References Cited

U.S. PATENT DOCUMENTS

| | | | |
|---|---|---|---|
| 2013/0004246 A1* | 1/2013 | Cawood | E21D 20/026 |
| | | | 405/259.6 |
| 2015/0023740 A1* | 1/2015 | Keller | E21D 21/0026 |
| | | | 405/259.1 |
| 2015/0322785 A1* | 11/2015 | Ahola | E21D 20/02 |
| | | | 405/259.3 |
| 2015/0354354 A1* | 12/2015 | Vahlstrom | E02D 5/80 |
| | | | 405/259.4 |
| 2018/0002885 A1* | 1/2018 | Sun | H02S 20/10 |
| 2018/0066519 A1* | 3/2018 | Faulkner | E21D 20/028 |
| 2018/0100280 A1* | 4/2018 | Kim | E02D 5/808 |
| 2020/0291593 A1* | 9/2020 | Aschenbroich | E02D 5/80 |

\* cited by examiner

CONTROLLING BACKFLOW FROM DRILLING WITH HOLLOW REBAR AND GROUTING

TECHNICAL FIELD

This application is related to the field of installing ground anchors, including tie-back anchors and micro-piles, in particular where ground water pressure is encountered.

BACKGROUND OF THE INVENTION

A micro-pile is a relatively small-diameter grouted pile, which may include a central steel reinforcement member. A micro-pile may be considered a friction pile in that at least a portion of the load it is transferred to the surrounding ground (e.g., soil or rock) in which it is inserted by friction along the length of the micro-pile. A micro-pile may be used to transfer the load of a structure, for example a steel or concrete foundation, slab and/or floor, into the underlying soil, along a length of the micro-pile.

A tie-back anchor is a structural element inserted into the ground to transfer applied tensile load into the ground, for example, through a wall (e.g., a retaining wall and/or the wall of an excavation) to assist the wall in supporting the load. Tieback anchors may be drilled or otherwise inserted into the ground (e.g., through a wall) using a relatively small diameter bar, which may be solid (e.g., steel rebar) or hollow (e.g., hollow steel rebar) at an angle, for example, between 15 and 45 degrees A tieback anchor may be grouted as well, in which grout may be introduced into the ground to increase ground resistance and prevent the tie-back anchor from pulling out, reducing the risk for destabilization of the wall.

Micro-piles and tie-back anchors are examples of structures referred to herein as "ground anchors" that provide support to another structure (e.g., foundations and/or walls) by anchoring them in some fashion to the adjacent ground (e.g., soil), thereby transferring at least a portion of a load being borne by the structure into the adjacent ground. Ground anchors may use grout, for example, a cement-based grout (e.g., neat cement grout; i.e., Portland cement and water) to assist in the anchoring.

SUMMARY OF THE INVENTION

In some embodiments of the system described herein, a method is performed for a cylinder at least partially disposed within a structure, a valve device disposed above the cylinder, and a hollow bar extending through the pinched valve device and the cylinder into one or more layers of materials beyond a bottom of the cylinder. The method includes maintaining the valve device in a closed position to control backflow caused by the grout delivered to at least one of the one or more layers through the hollow bar while the grout is delivered, disposing a flexible annular member around the hollow bar in a first position above the valve device, after disposing the annular flexible member, opening the valve device into the open position, forcing the annular member down the hollow bar, through an interior cavity of the valve device to a second position below the valve device, and removing the valve device after the annular member reaches the second position. The hollow bar may be a hollow rebar hollow bar, and the method may include plugging an upper end of the hollow rebar hollow bar prior to forcing the annular member down the hollow bar. A pressure relief valve may be disposed at a third position proximate to a top of the cylinder, and the method may further include opening the pressure relief valve prior to forcing the annular member down the hollow bar to allow the backflow to be forced downward in the cylinder by downward movement of the annular member. The method may further include closing the pressure relief valve after the annular member reaches the longitudinal position, where the delivered grout and backflow cure while the valve device remains removed and the pressure valve is in the closed position. The method may further include, after closing the pressure valve, removing the annular member from around the hollow bar. An inner surface of the cylinder may have approximately a same diameter as a diameter of the interior cavity of the valve device, and the second position may be within the cylinder and proximate to the third position. The pinched valve in the closed position may hold the hollow bar in place while delivering the grout. Forcing the annular member down the hollow bar may include mounting a nut on the hollow bar above the annular member and screwing the nut downward against the annular member. The flexible annular member may be a rubber seal, the valve device may include a pinched valve, and the backflow may include grout.

In some embodiments of the system described herein, a system includes: a cylinder at least partially disposed within a ground anchor, a hollow bar, extending through a pinched valve device and the cylinder into one or more layers of materials beyond a bottom of the cylinder, for delivering grout to at least one of the one or more layers, which causes a backflow to flow into the cylinder, the valve device, disposed above the cylinder, having a closed position that controls the backflow while grout is delivered through the hollow bar, and having an open position, and a flexible annular member disposed around the hollow bar, where the flexible annular device is movable when the valve device is in the open position, from a first position along the hollow bar above the valve device through an interior cavity of the valve device to a second position below the valve device. The hollow bar may be hollow rebar, and the system may further include a plug that plugs an upper end of the hollow rebar hollow bar. The system may further include a pressure relief valve disposed at a third position proximate to a top of the cylinder, the pressure relief valve having an open position that allows the backflow to be forced downward in the cylinder by downward movement of the annular member. The pressure relief valve may have a closed position that prevents passage of the backflow. The annular member may be removable from around the hollow bar. An inner surface of the cylinder may have approximately a same diameter as a diameter of the interior cavity of the valve device, where the second position is within the cylinder and proximate to the third position. The pinched valve device in the closed position may hold the hollow bar in place while the grout is delivered. The system may further include a nut mounted on the hollow bar above the annular member, the nut downwardly movable against the annular member to move the annular member downward. The flexible annular member may be a rubber seal, the valve device may include a pinched valve and the backflow may include grout.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1A:
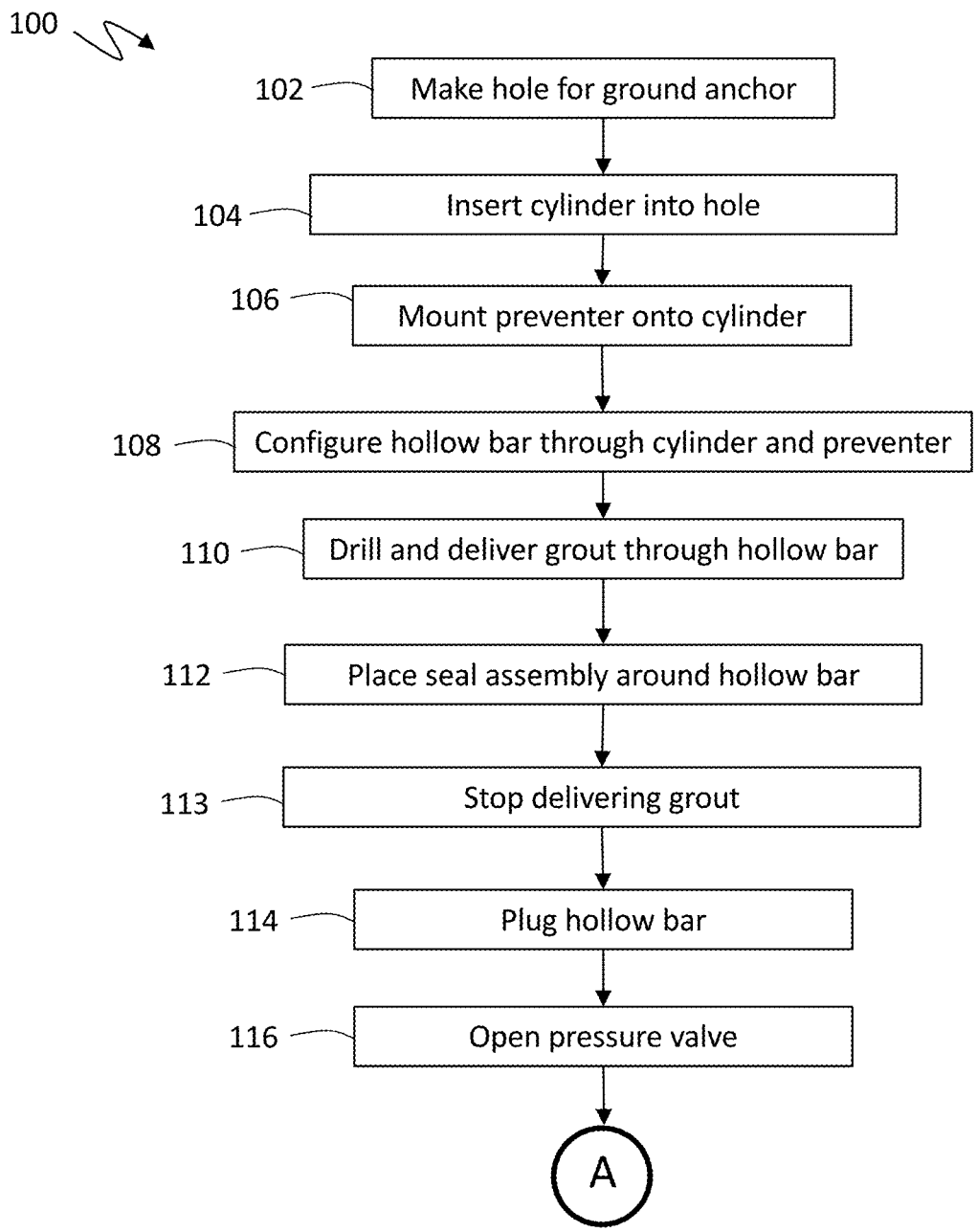
FIGS. 1A and 1B collectively are a flowchart illustrating an example of method of controlling backflow during installation of a ground anchor, according to an embodiment of the system described herein.

Hollow rebar may be used for structural reinforcement in a ground anchor. Rebar (short for reinforcing bar) is steel bar used as a tensioning or compression device. Hollow rebar may provide high strength reinforcement in the ground anchor. Hollow rebar, having ridges, threads and/or other appropriate surface deformations, provides improved adhesion to concrete. In addition, it is possible to use the hollow rebar to perform grouting. When used to perform grouting, hollow rebar may be used to deliver grout through the hollow rebar, for example, to the ground adjacent to a structure, for example, next to a wall or beneath a foundation or slab.

The use of hollow rebar for ground anchors may provide a valuable engineering alternative that may both reduce material and labor costs for ground anchors. Problems may arise when installing ground anchors into ground that has high water pressure, for example, when doing so at a depth below a water table. For example, because of the high water pressure, the drilling and grouting may result in water, grout and soil flowing back into the ground anchor, hole or the area beyond the structure and hole, for example, beyond a wall, foundation or slab. The one or more materials flowing back into and/or through a ground anchor as a result of grouting may be referred to herein collectively as "backflow." If this backflow is not controlled in some manner, it could result in erosion of the ground being drilled and grouted. Given the content of the backflow, including grout, water and perhaps soil, at least portions of the backflow may be viscous and include a high enough concentration of cement to cure over time like the grout itself. Thus, references to curing of the backflow herein means curing of any portions of the backflow having a sufficient cement concentration to cure.

One potential solution to this problem is to de-water the ground around the structure being anchored, but this solution can be very expensive and can cause settling of existing structures in the ground.

Another potential solution is to employ a mechanism referred to herein as a "preventer" or "backflow preventer" that controls the amount of backflow by preventing at least some of the backflow from flowing back through the wall, slab, foundation or other structure into the and through the ground anchor. Any of a variety of mechanisms that allow drilling and grouting, but prevent at least a portion of backflow, may be used as a preventer, for example, a pinch valve device. A hole may be made (e.g., drilled) into a structure (e.g., a wall, foundation or slab) to accommodate a ground anchor, and a cylinder (e.g., a flanged tube) may be disposed therein. Alternatively, in the case of a steel wall, for example, the cylinder may be welded into the structure. The pinch valve device or other type of preventer may be mounted above the cylinder along a longitudinal dimension of the cylinder (e.g., centered on a longitudinal axis of the cylinder), and a hollow bar (e.g., hollow rebar) with a drill bit affixed thereto may be run through the pinch valve and cylinder into the ground beneath the cylinder (e.g., through a concrete or steel wall, concrete slab or base of a concrete foundation). The pinch valve may be maintained in a closed position around the hollow bar to prevent at least some of the backflow from flowing through the ground anchor. It may be desirable to allow at least some of the backflow to flow back through the cylinder and pinch valve device where the cement-based grout is being added. If the pressure is too high, the pinch valve device may fail (e.g., the internal flexible seal may wear), and if the pressure is too low, soil erosion may result due to the amount of material backflowing out of the ground. To this end, the preventer may be controlled to maintain a desired pressure during drilling, grouting, and curing of the grout (in the ground) and any backflow within the cylinder.

In this potential solution, during curing, a blank flange (or other mechanism) may be affixed to the top of the preventer. The hollow bar, the last drill bit used during drilling (the drill bit may be replaced during drilling), and the preventer used to introduce the grout may remain during curing of the grout. After curing, the preventer and blank flange may be removed, and a head plate may be affixed to the top of the cylinder (e.g., to the flange of the flanged tube).

One potential drawback of this solution is that the preventer remains affixed to the cylinder during curing, which can take several hours or even more, after which it can be removed with at least portion of the backflow fully cured (and thus hardened) inside it and attached to the hollow bar, such that removal requires separating the preventer from the hollow bar (which may have been pre-lubricated to ease separation). After separation, the preventer must be cleaned to remove any residual cured backflow. The removal and cleaning process may be costly and time consuming. Further, the preventer is unavailable for other uses while the cement-based grout and backflow are curing and while the preventer is being removed and cleaned. Accordingly, to be able to complete a project requiring installation of many ground anchors in a timely fashion, several preventers (e.g., pinch valves) may need to be used concurrently, for example, tens or even hundreds of preventers may be needed. Further, for each preventer, a blank flange for sealing the preventer during curing is required. The acquisition of several preventers and blank flanges for a project may increase, perhaps significantly, the cost of the project.

What is desired is a system and/or technique using a preventer to control backflow during installation of a ground anchor while reducing or avoiding the time and/or cost involved in waiting for the grout and backflow to cure, and in removing and cleaning the preventer.

Described herein is a system and techniques for controlling backflow during installation of a ground anchor that includes using a preventer while drilling and grouting and removing the preventer while the grout cures, i.e., before it hardens, for example, shortly after finishing delivering the grout. The system described herein may be used in a variety of situations, including installing micro-piles (tension or compression), tie-back anchors (e.g., for secant piled walls, diaphragm walls and sheet piled walls) or other ground anchors. By removing the preventer before the grout hardens, the time waiting for the grout and backflow to cure is eliminated. Further, as the backflow has not yet cured when the preventer is removed, the time and cost spent removing and cleaning the preventer is reduced. Moreover, no blank flange for sealing the preventer during curing is required. Accordingly, the number of preventers required for a large project may be reduced significantly, and the need for blank flanges for the preventers during curing eliminated, thereby reducing the cost of the project, perhaps significantly.

Embodiments of the system and techniques described herein are described in relation to installing ground anchors. It should be appreciated that the system and techniques described herein are not limited to installing ground anchors, but may be applied to the installation of any structure in the ground that involves drilling and grouting.

Embodiments of the system described herein may be implemented using the Titan Backflow Preventer™ system, available from Con-Tech Systems Ltd, with main offices in Delta, British Columbia, Canada.

Figure 1B:
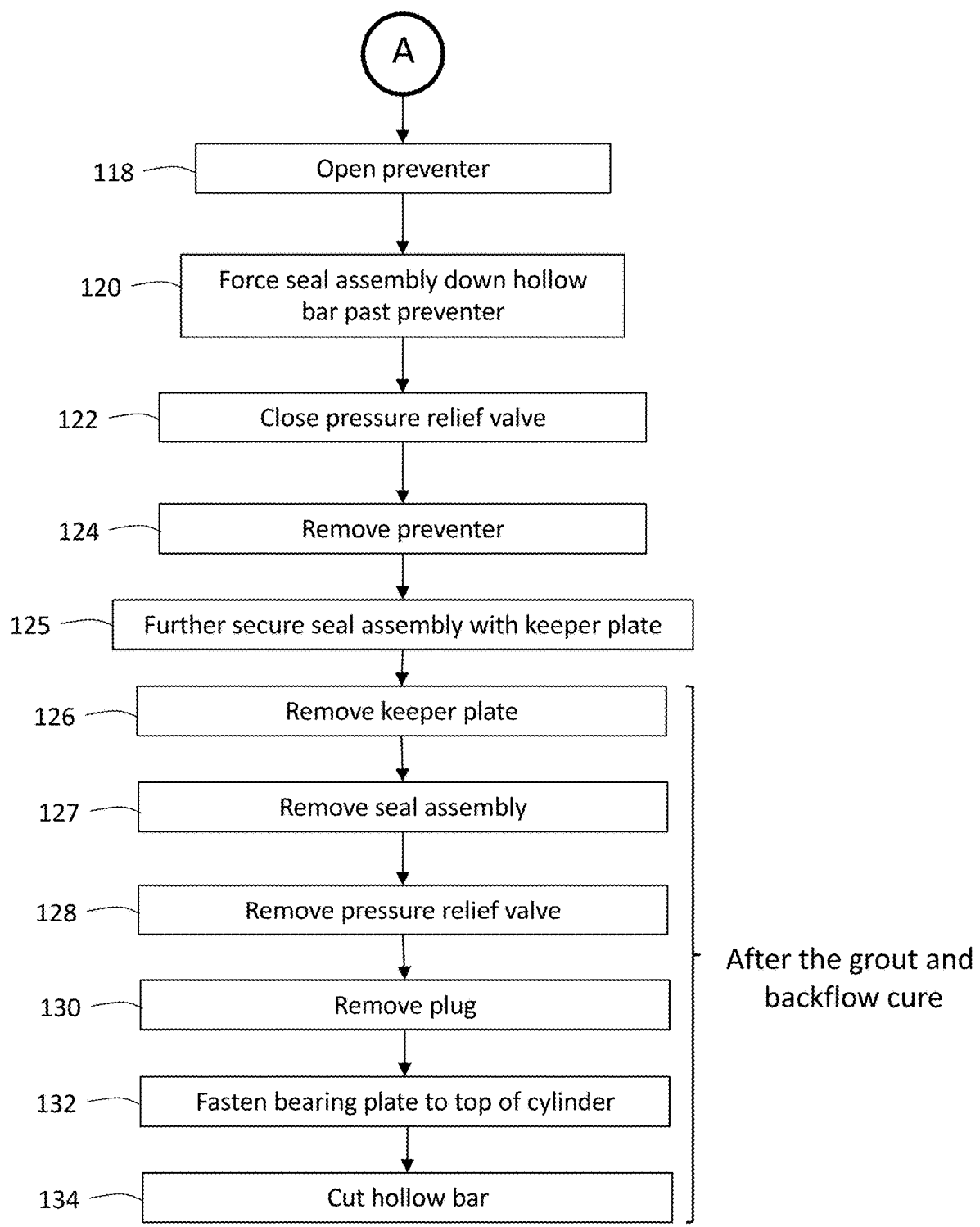

FIGS. 1A and 1B collectively are a flowchart illustrating an example of method 100 of controlling backflow during installation of a ground anchor, according to an embodiment of the system described herein. Other examples of a method of controlling backflow during installation of a ground anchor, for example, variations of method 100, are possible, and are intended to fall within the scope of the invention. While embodiments of method 100 are described or illustrated with respect to installing a ground anchor down through a foundation or slab, it should be appreciated that method 100 is not so limited, and a may be applied to installation of a ground anchor through a wall, for example, at a downward angle (e.g., between 15-45 degrees of a plane of the wall).

In a step 102, a hole may be made (e.g., drilled) in a substrate, for example, a concrete foundation, slab or wall. The dimensions of the hole (e.g., depth and diameter) may vary depending on a variety of factors, including, but not limited to: the type of ground anchor, the composition of the ground, the water pressure in the ground, the function being served, the structure being penetrated, the load being borne, and the dimensions and other physical properties of the cylinder to be at least partially inserted (which itself may depend on the other various factors). For example, in some embodiments, the depth of the hole may be about 0.4 meters (m) deep and have a diameter of about 200 millimeters (mm); e.g., into a concrete foundation, slab or wall having a depth of about 0.5 meters.

In a step 104, a cylinder (e.g., a flanged cylinder/tube) may be inserted at least partially into the hole. As an alternative to steps 102 and 104, for example, when installing a ground anchor in a steel wall, the cylinder may be welded to the structure (e.g., wall). The cylinder may be tension-resistant, pressure resistant and leak proof. Further, in some embodiments, grout may be applied along an exterior perimeter of the sides of the cylinder and on a surface of the substrate under a flange of the cylinder, for example, as illustrated in FIG. 2.

Figure 2:
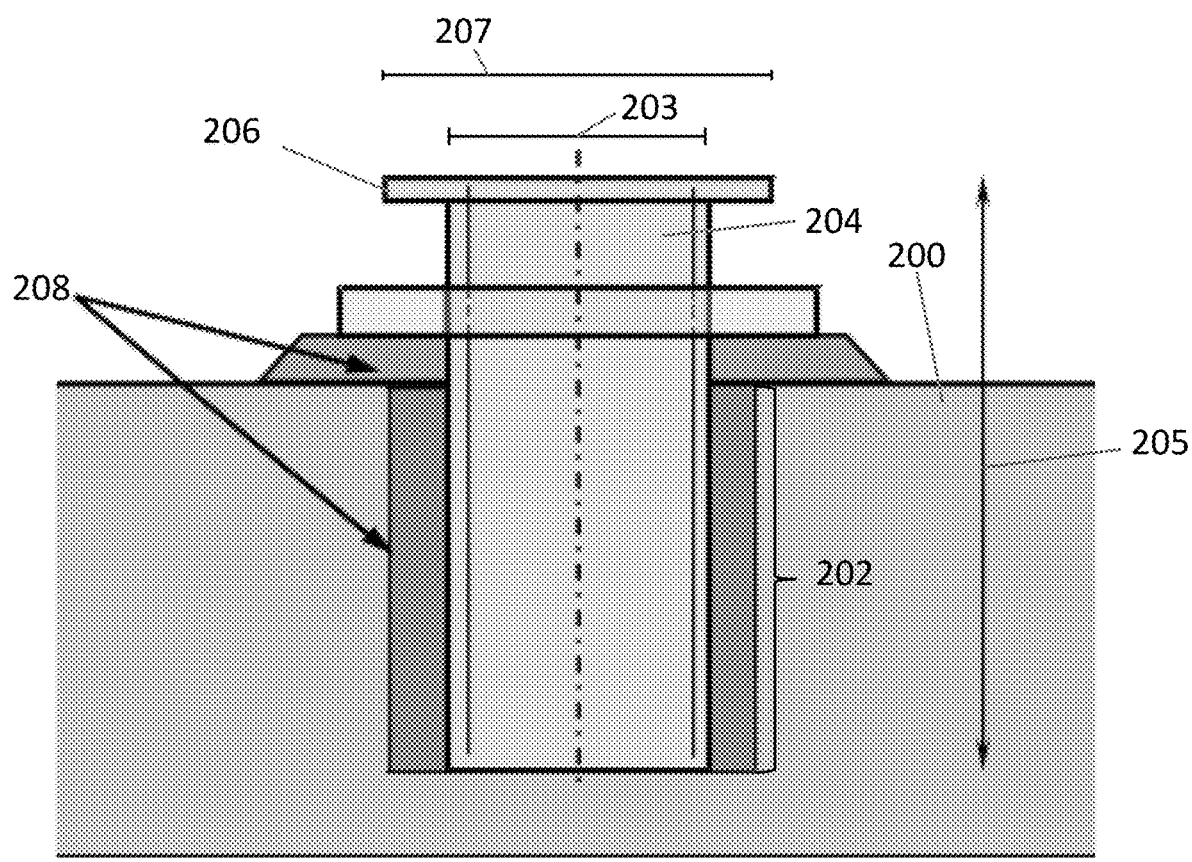
FIG. 2 is a schematic cross-sectional illustration showing an example of flanged cylinder partially disposed within a structure, according to an embodiment of the system described herein.

FIG. 2 is a schematic cross-sectional illustration showing an example of a flanged cylinder 204, having a length 205 and diameter 203, partially disposed within a hole 202 drilled into substrate 200, according to an embodiment of the system described herein. Other examples of a flanged cylinder disposed within a hole, for example, variations of what is illustrated in FIG. 2, are possible and are intended to fall within the scope of the invention. The substrate 200 may be a concrete foundation or slab, but is not so limited. The cylinder 204 may include a flange 206 having a diameter 207, and grout 208 (e.g., cement-based grout) may be applied and cured around the exterior perimeter of the cylinder 204 and along the surface of the substrate 200 under the flange 206 and extending further radially along the surface of the substrate 200 than the horizontal perimeter of the flange 206. The cylinder, including its flange, may have any of a variety of dimensions based on any of a variety of the factors described elsewhere herein in relation to the hole. For example, in some embodiments, cylinder may have a length 205 of about 0.6 m and a diameter 203 of about 273 mm, and the diameter 207 of the flange may be about 395 mm.

Returning to method 100, in a step 106, a preventer may be mounted above the cylinder along a longitudinal dimension of the cylinder (e.g., centered on a longitudinal axis of the cylinder). Mounting the preventer may include fastening a flange of the preventer to a flange of the cylinder using bolts, washers, etc. In some embodiments, the preventer may be, or include, a pinch valve device, for example, the pinch valve device 300 described in relation to FIGS. 3A-3D herein.

Figure 3A:
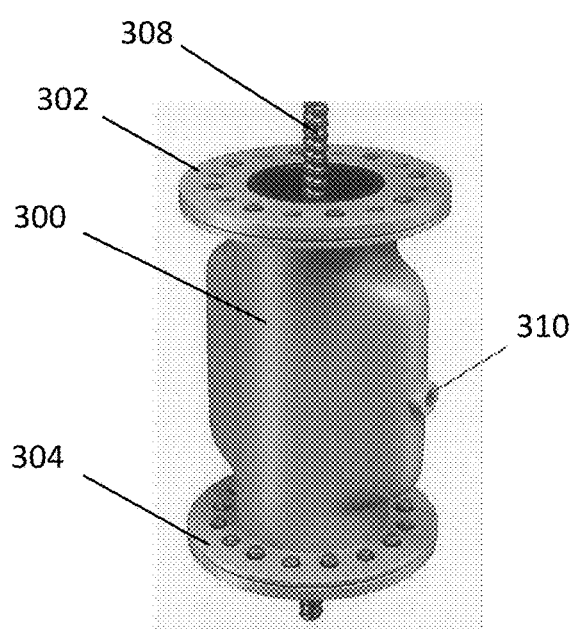
FIGS. 3A, 3B, 3C and 3D illustrate an example of a pinch valve device that may serve as a preventer, according to an embodiment of the system described herein.
Figure 3B:
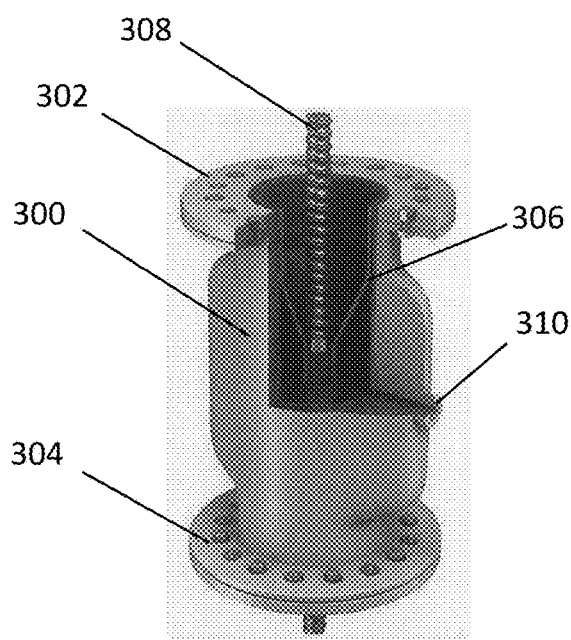
Figure 3C:
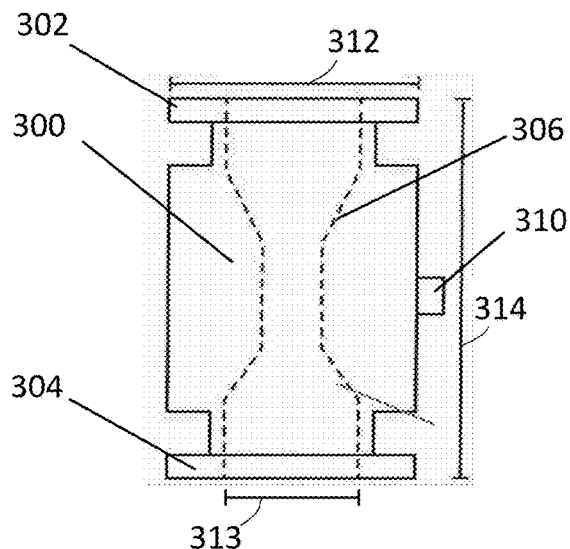
Figure 3D:
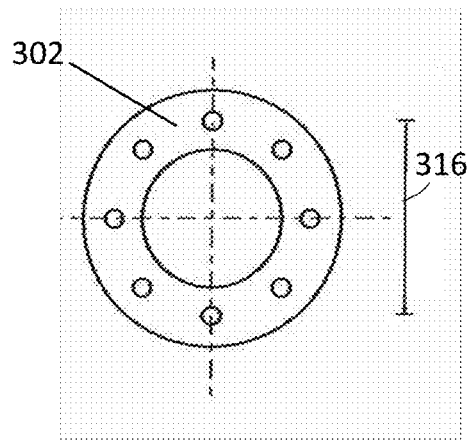

FIGS. 3A-3D illustrate an example of the pinch valve device 300 that may serve as a preventer, according to an embodiment of the system described herein. Other examples of a preventer, for example, variations of the pinch valve device 300, are possible, and are intended to fall within the scope of the invention. FIG. 3A is a perspective view of the pinch valve device 300. FIG. 3B is a perspective view of the pinch valve device 300 with a cut-away portion. FIG. 3C is a schematic cross-sectional view of the pinch valve device 300, and FIG. 3D is a top plan view of a top flange 302 of the pinch valve device 300, and also may be a bottom plan view of the bottom flange 304.

The pinch valve device 300 may include any of: the top flange 302, the bottom flange 304, a pressure control valve 310; a sleeve 306; and one or more other components. The sleeve 306, located within the interior of the pinch valve device 300, may be made of one or more flexible materials (e.g., rubber) and may be inflatable. When the sleeve 306 is inflated, the pinch valve device 300 is in a closed position (as illustrated in FIG. 3C) to restrict passage of materials through the device, and when the sleeve is in a deflated position (not shown), the pinch device it is in an open position that allows passage of materials through the device. Pressure (e.g., air pressure) may be applied to, and released from, the sleeve 306 via the pressure control valve 310. That is, the pressure applied to the sleeve 306 may be controlled using the pressure control valve 310. For example, an air hose (not shown) may be attached to the pressure control valve 310 on one end and an air compressor (not shown) on the other end. The air compressor may be used to control the amount and rate of air applied to the sleeve 306 via the pressure control valve 310.

In some embodiments described in more detail elsewhere herein, hollow bar 308 may be fed through the pinch valve device 300 during installation of a ground anchor. Any of a variety of types of hollow bar having any of a variety of dimensions (including inside and outside diameters) and other physical properties may be used depending on any of a variety of factors, including: the type, dimensions and other physical properties of the preventer, cylinder, hole, other components of the ground anchor and the overall system into which the ground anchor is being installed (e.g., concrete foundation, slab, secant piled walls, diaphragm walls, sheet piled walls); and other structural needs. For example, the hollow bar may be any of: TITAN IBO® 52/26 (T52/26), TITAN IBO® 73/53 (T73/53), TITAN IBO® 73/56 (T73/56), TITAN IBO® 73/45 (T73/45), TITAN IBO® 103/78 (T103/78); TITAN IBO® 103/78 (T103/51), or other hollow bar having any dimensions (e.g., inside and outside diameters) and other physical properties appropriate based on structural needs.

The pinch valve device 300 may have an outer diameter (OD) 312, an inner diameter (ID), and a length (L) 314. The top flange 302 and bottom flange 304 each may have a diameter (Tk) between the center of opposite fastening holes 316. Any of a variety of different types of pinch valve devices having any of a variety of dimensions (including inside and outside diameters) and other physical properties may be used depending on any of a variety of factors, including: the type, dimensions and other physical properties of hollow bar (or other types of hollow bars being used), cylinder, hole, other components of the ground anchor (e.g., micro-pile, tie-back anchor, other) and the overall system into which the ground anchor is being installed; and other structural needs. For example, the DN150 or DN250 pinch valve may be used, e.g., based on the size of TITAN hollow rebar used as set forth in Table 1 below.

TABLE 1

Pinch Valve Models for Hollow Rebar Sizes

| Rebar OD (mm) | Pinch Valve Model | ID (mm) | OD (mm) | L (mm) | Tk (mm) | Max pressure (bars) | Weight (kg) | Max TITAN drill bit (mm) |
|---|---|---|---|---|---|---|---|---|
| Up to 52 | DN150 | 145 | 285 | 420 | 240 | 6 | 17.5 | 130 |
| 73 and 103 | DN250 | 250 | 395 | 610 | 350 | 3 | 55 | 220 |

Returning to method 100, in a step 108, a hollow bar (e.g., a hollow rebar) may be configured through the cylinder (e.g., 204) and preventer (e.g., 300). For example, the hollow bar with a drill bit affixed thereto may be run through the preventer (e.g., as illustrated in FIGS. 3A and 3B) and cylinder to the base of the cylinder. In a step 110, the hollow bar and drill-bit may be used to drill through the base into the ground beneath the cylinder (e.g., through a base of a concrete foundation), and grout may be delivered under pressure through the tip of the hollow bar via or near the drill bit into the ground. During the drilling process, depending on the desired depth of the tubing in the ground, the hollow bar may include one or more segments (e.g., 10-foot segments) coupled to one another to produce a desired length, and the couplings may be watertight with rubber seals to prevent leakage. The hollow bar, including each segment of the hollow bar, may be hollow rebar that includes threads or ridges that eliminate debonding of the hollow bar from grout and/or backflow.

Water pressure in the ground may cause backflow to flow up through the cylinder into the preventer during the drilling and delivering of grout into the ground. While the grout is being delivered, the preventer may be maintained in a closed position around the hollow bar to prevent at least some of the backflow from flowing through the ground anchor—i.e., to control the backflow. It may be desirable to allow at least some of the backflow to flow back through the cylinder and pinch valve device to relieve pressure in the ground where the grout it being added. If the pressure is too high, the pinch valve device may fail (e.g., the internal flexible seal may wear), and if the pressure is too low, soil erosion may result due to the amount of material backflowing out of the ground. To this end, the preventer may be controlled to maintain a desired pressure during grouting, and during the curing of the grout in the ground and of any backflow within the cylinder. In some embodiments, a pressure of 0.5 bars above the pressure of the ground water may be maintained. In some embodiments, the cylinder may include a pressure relief valve, which may remain closed during the drilling and grout introduction to maintain pressure within the cylinder.

In step 112, before, during or after finishing delivering the grout, a seal assembly may be placed around the hollow bar above the preventer. The seal may include an annular foam-rubber seal (or other type of flexible annular member) having an outer diameter slightly larger than an inner diameter of an interior cavity of the preventer. The seal assembly also may include a nut, for example, a collar nut, which may be threaded about the hollow bar.

FIGS. 4A, 4B, 4C and 4D are schematic cross-sectional illustrations of a system 400 for controlling backflow during installation of a ground anchor at different stages of the installation, according to an embodiment of the system described herein. Other examples of a system for controlling backflow during installation of a ground anchor, for example, variations of the system 400, are possible, and are intended to fall within the scope of the invention. The system 400 may include any of: a substrate 200; the flanged cylinder 204, including a pressure relief valve 412; a preventer 402 (e.g., the pinch valve device 300), including an inflatable sleeve 403 and a pressure control valve 402; a hollow bar 408; a backflow 414; an annular seal 406; a collar nut 404; a plug 409; a bearing plate 416; an anchor nut 418; a keeper plate 419; a hexagonal nut 422, one or more (e.g., 4) bolts 420; other components; or any suitable combination of the foregoing. The bottom of the hollow bar 408 (not shown) is below the substrate 200 in the ground, and a has a drill bit (not shown) affixed thereto.

Figure 4A:
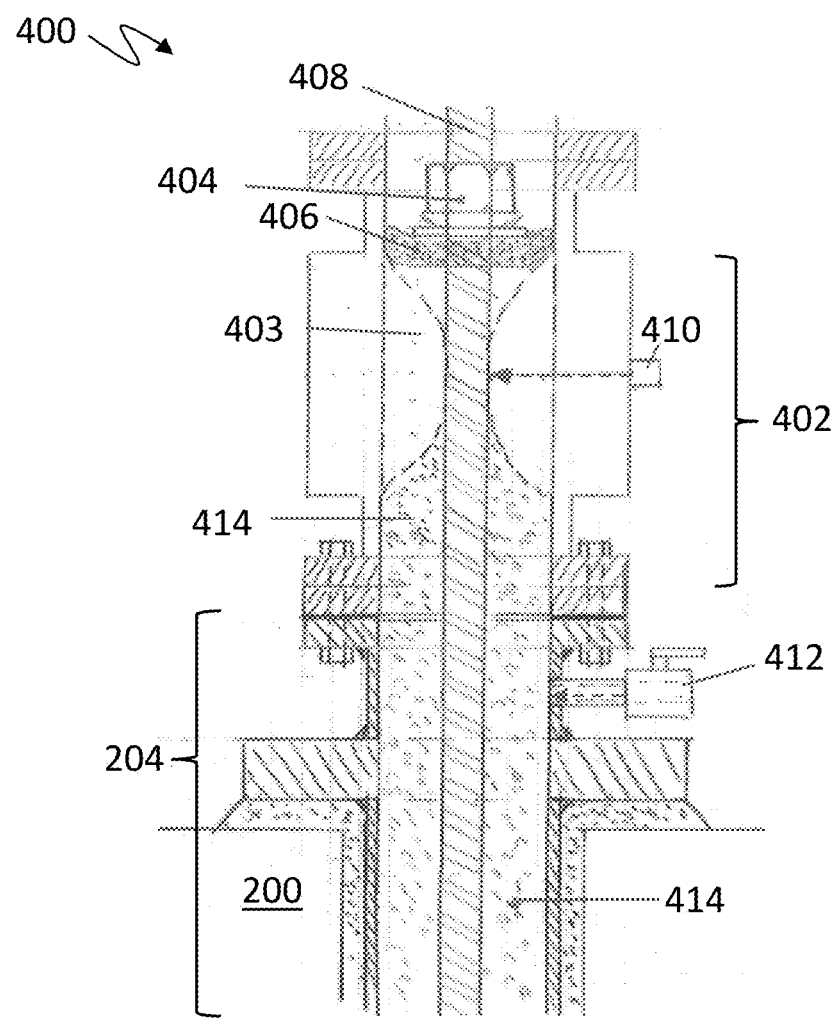
FIGS. 4A, 4B, 4C and 4D are schematic cross-sectional illustrations of a system for controlling backflow during installation of a ground anchor at different stages of the installation, according to an embodiment of the system described herein.

FIG. 4A illustrates an example of a state of the system 400 after performance of the step 112 of method 100. Air pressure (not shown) applied to the control valve 410 of preventer 410 keeps the sleeve 403 inflated to maintain the preventer 402 is a closed position in which the backflow 414 is controlled, while the pressure relief valve 412 of the flanged cylinder 204 remains closed to keep pressure within the cylinder and preventer.

Returning to method 100, in a step 113, the delivering of the grout may be stopped (e.g., completed). Grout may remain in the hollow bar (e.g., the hollow bar 408) following the step 113 and cure during the remainder of the grouting process. In a step 114, the hollow bar may be plugged with a plug (e.g., the plug 409). The hollow bar may be plugged so that, when the seal assembly is forced down applying pressure to the backflow, the pressure does not force the backflow or grout to flow back up through the hollow bar. In a step 116, the pressure valve of the cylinder (e.g., the pressure valve 412) is opened to release pressure within the cylinder, which will enable the backflow to be pushed down by the seal assembly (or at least allow the backflow to be forced down with less force). In a step 118, the preventer 118 may be opened into the open position, for example, by reducing air pressure applied to the sleeve 403 so that the sleeve deflates. In a step 120, the seal assembly (e.g., the annular seal 406 and the collar nut 404) may be forced downward, through the cavity of the preventer 404 defined in part by the deflated sleeve 403, for example, to a position near the top of the cylinder 204, e.g., proximate to the pressure relief valve 412. The seal assembly may be forced down by using a wrench or other mechanical device to screw a nut of the assembly down the hollow bar. That is, the hollow bar may have threading that is configured to receive the nut.

Figure 4B:
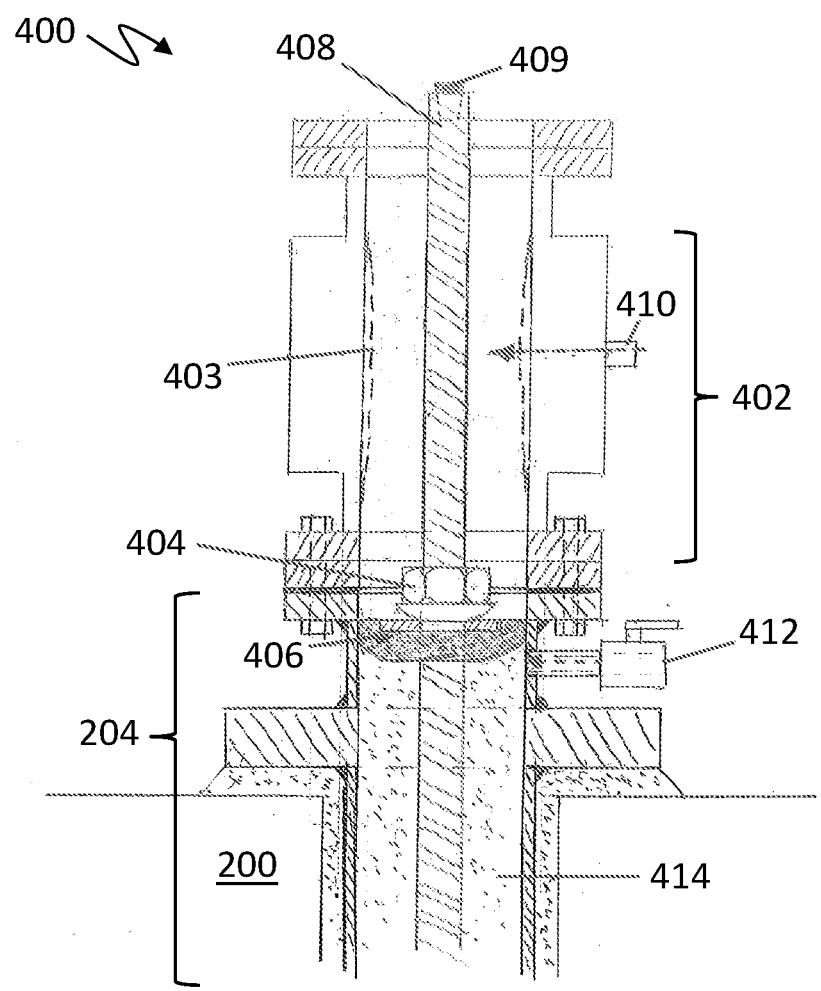

FIG. 4B illustrates an example of a state of the system 400 after performance of the step 120 of the method 100.

In a step 122, the pressure relief valve may be closed so that pressure may be maintained while the grout and backflow cure. In a step 124, the preventer may be removed while the grout and backflow are not yet cured, e.g., by de-fastening a flange of the preventer from a flange of the cylinder. For example, steps 114-124 may be performed as soon as practicable following the stopping of grout delivery in the step 113, so the preventer may be removed as soon as practicable.

In some embodiments, for example, when the water pressure in the ground is very high, a keeper plate (e.g., the keeper plate 419 in FIG. 4C) may be secured to the top of the cylinder 204 (e.g., the flange of the cylinder); e.g., using the hexagonal nut 422 threaded to the hollow bar 408 and four bolts 420 fastened to the flange of the cylinder 204 and the keeper plate. In such embodiments, the secured keeper plate applies downward force against the seal assembly to help resist the backflow during curing.

Figure 4C:
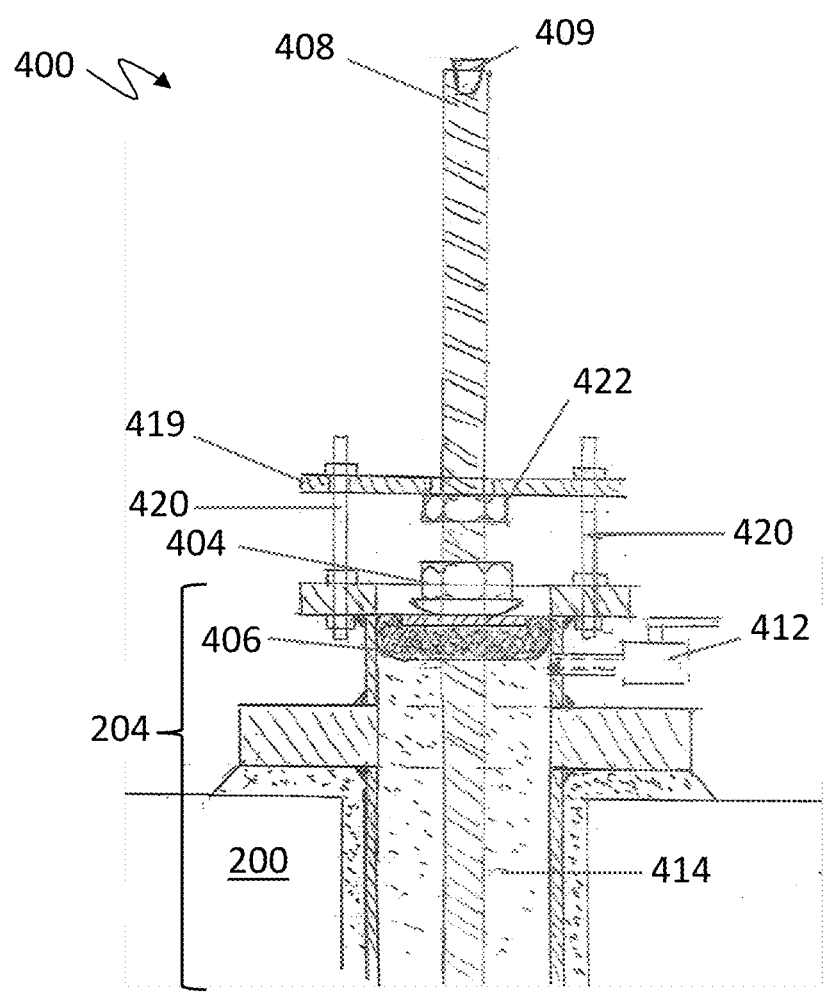

FIG. 4C illustrates an example of a state of the system 400 after performance of the step 125 of the method 100.

After the grout and backflow have cured, any of the following steps may be performed: the keeper plate may be removed in a step 126; the seal assembly may be removed in a step 127; the pressure relief valve 412 may be removed in a step 128; the plug 409 may be removed in a step 130; a bearing plate (e.g., the bearing 416) plate may be fastened to the top of the cylinder, for example, using an anchor nut 418, in a step 132; and the hollow bar may be cut, for example, at position 420, to shorten the length of hollow bar protruding from the ground anchor. Any of the foregoing removed components may be re-used, for example, to install a next ground anchor.

Figure 4D:
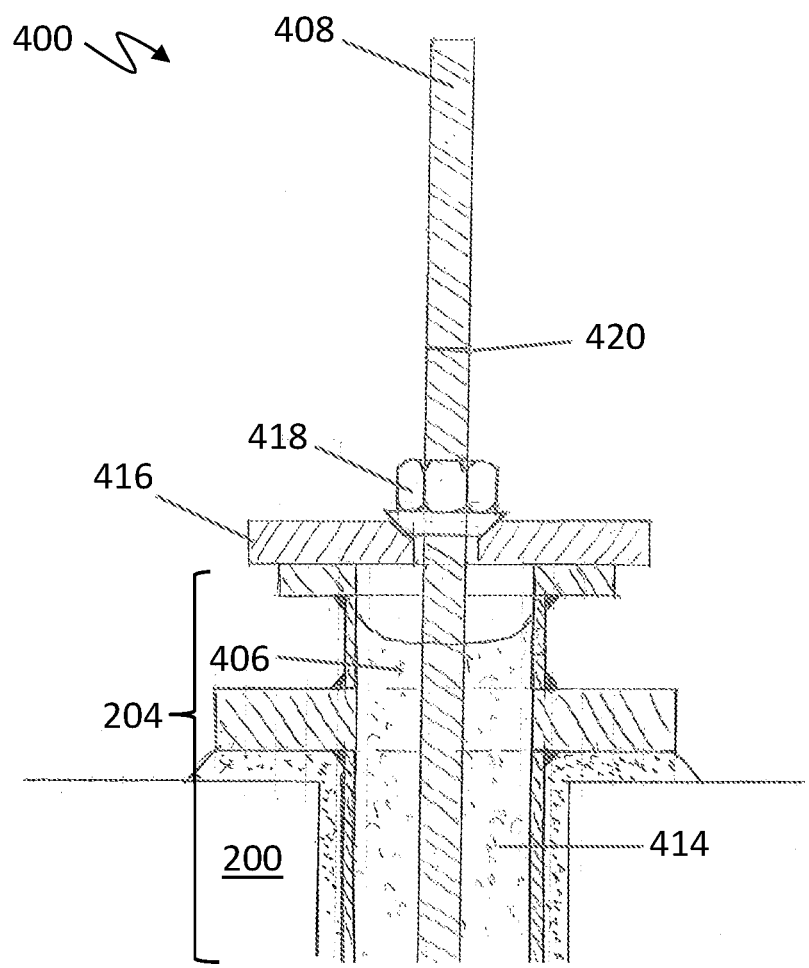

FIG. 4D illustrates an example of a state of the system 400 after performance of the step 132 of the method 100.

In some embodiments of the system described herein, more than one preventer may be used, for example, by mounting a second preventer on top of the preventer described in relation to FIGS. 1-4C. A second preventer may be used to ensure enough resistance is available to control backflow (e.g., in case of very high water pressure). In such embodiments, the second preventer may be mounted, used, controlled and removed in at least a similar fashion as described herein in for the preventer, for example, in relation to method 100.

By using the system described herein, including removing the preventer while the grout cures, the time waiting for the grout and backflow to cure is eliminated, and the preventer can be re-used for another purposes (e.g., installation of a next ground anchor) while the grout (and backflow) cure. Further, as the backflow has not yet hardened when the preventer is removed, the time and cost spent removing and cleaning the preventer is reduced. Further, the seal assembly, including the annular member (e.g., of foam rubber), may be relatively cheap, adding little to the over-all cost of the system, and the seal assembly may be re-used after being removed. Moreover, no blank flange for sealing the preventer during curing is required. Accordingly, the number of preventers required for a large project may be reduced significantly, and the need for blank flanges for the preventers during curing eliminated, thereby reducing the cost of the project, perhaps significantly.

Various embodiments discussed herein may be combined with each other in appropriate combinations in connection with the system described herein. Additionally, in some instances, the order of steps in the flowcharts, flow diagrams and/or described flow processing may be modified, where appropriate.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a cylinder at least partially disposed within a structure, a valve device disposed above the cylinder, and a hollow bar extending through the pinched valve device and the cylinder into one or more layers of materials beyond a bottom of the cylinder, a method comprising:
   while grout is delivered to at least one of the one or more layers through the hollow bar, maintaining the valve device in a closed position to control backflow caused by the grout delivery and water pressure;
   disposing a flexible annular member around the hollow bar in a first position above the valve device;
   after disposing the annular flexible member, opening the valve device into the open position;
   forcing the annular member down the hollow bar, through an interior cavity of the valve device to a second position below the valve device; and
   removing the valve device after the annular member reaches the second position.

2. The method of claim 1, wherein the hollow bar is a hollow rebar, the method further comprising:
   plugging an upper end of the hollow rebar prior to forcing the annular member down the hollow bar.

3. The method of claim 1, wherein a pressure relief valve is disposed at a third position proximate to a top of the cylinder, and
   wherein the method further comprises opening the pressure relief valve prior to forcing the annular member down the hollow bar to allow the backflow to be forced downward in the cylinder by downward movement of the annular member.

4. The method of claim 3, further comprising:
   closing the pressure relief valve after the annular member reaches the longitudinal position,
   wherein the delivered grout and backflow cure while the valve device remains removed and the pressure valve is in the closed position.

5. The method of claim 4, further comprising:
   after closing the pressure valve, removing the annular member from around the hollow bar.

6. The method of claim 3, wherein an inner surface of the cylinder has approximately a same diameter as a diameter of the interior cavity of the valve device, and
   wherein the second position is within the cylinder and proximate to the third position.

7. The method of claim 1, wherein the pinched valve in the closed position holds the hollow bar in place while delivering the grout.

8. The method of claim 1, wherein forcing the annular member down the hollow bar includes mounting a nut on the hollow bar above the annular member and screwing the nut downward against the annular member.

9. The method of claim 1, where the flexible annular member is a rubber seal.

10. The method of claim 1, wherein the valve device includes a pinch valve.

11. A system comprising:
a cylinder at least partially disposed within a ground anchor;
a hollow bar, extending through a pinched valve device and the cylinder into one or more layers of materials beyond a bottom of the cylinder, for delivering grout to at least one of the one or more layers, which along with water pressure causes a backflow to flow into the cylinder;
the valve device, disposed above the cylinder, having a closed position that controls the backflow while grout is delivered through the hollow bar, and having an open position; and
a flexible annular member disposed around the hollow bar, wherein the flexible annular device is movable when the valve device is in the open position, from a first position along the hollow bar above the valve device through an interior cavity of the valve device to a second position below the valve device.

12. The system of claim 11, wherein the hollow bar is a hollow rebar, the system further comprising:
a plug that plugs an upper end of the hollow rebar.

13. The system of claim 11, further comprising:
a pressure relief valve disposed at a third position proximate to a top of the cylinder, the pressure relief valve having an open position that allows the backflow to be forced downward in the cylinder by downward movement of the annular member.

14. The system of claim 13, wherein the pressure relief valve has a closed position that prevents passage of the backflow.

15. The system of claim 14, wherein the annular member is removable from around the hollow bar.

16. The system of claim 13, wherein an inner surface of the cylinder has approximately a same diameter as a diameter of the interior cavity of the valve device, and
wherein the second position is within the cylinder and proximate to the third position.

17. The system of claim 11, wherein the pinched valve device in the closed position holds the hollow bar in place while the grout is delivered.

18. The system of claim 11, further comprising a nut mounted on the hollow bar above the annular member, the nut downwardly movable against the annular member to move the annular member downward.

19. The system of claim 11, where the flexible annular member is a rubber seal.

20. The system of claim 11, wherein the valve device includes a pinch valve.

* * * * *